S. S. VATHING AND E. O. LAUGEN.
GAGE RUNNER FOR PLANTERS.
APPLICATION FILED JUNE 18, 1919.
1,318,419.   Patented Oct. 14, 1919.
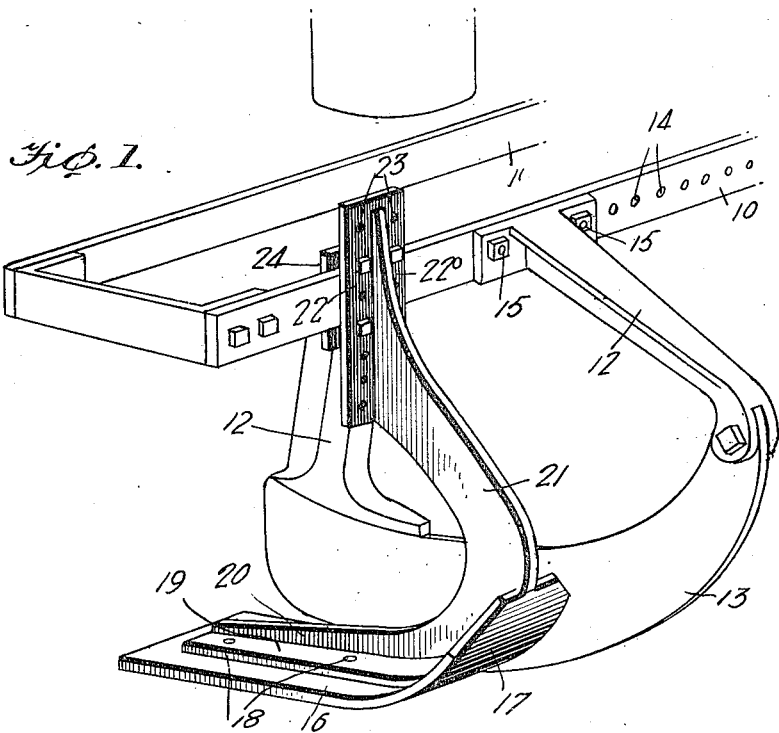
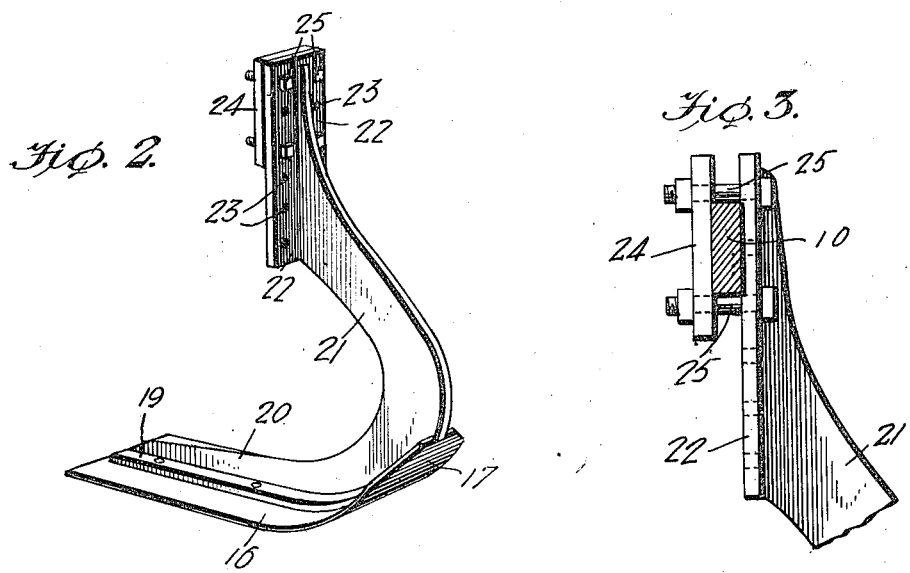

UNITED STATES PATENT OFFICE.

SOLVIE S. VATHING AND EDWARD O. LAUGEN, OF HOUSTON, MINNESOTA.

GAGE-RUNNER FOR PLANTERS.

1,318,419.

Specification of Letters Patent. Patented Oct. 14, 1919.

Application filed June 18, 1919. Serial No. 304,994.

*To all whom it may concern:*

Be it known that we, SOLVIE S. VATHING and EDWARD O. LAUGEN, citizens of the United States, and residents of Houston, in the county of Houston and State of Minnesota, have invented certain new and useful Improvements in Gage-Runners for Planters, of which the following is a specification.

Our present invention relates generally to gages and more particularly to gage runners of planters and the like, our object being the provision of a simple, strong, convenient gage runner for planters of a nature capable of readily adjustable connection both horizontally and vertically with the frame of a planter, as distinguished from the usual connection with the planting shoe or its support arms so as to be shiftable to either side of the planting shoe, as may be desired.

With the above in mind, our invention resides therefore in the features of the gage runner now to be described with respect to the accompanying drawing forming a part of this specification and in which—

Figure 1 is a perspective view illustrating the practical application of our invention;

Fig. 2 is a detailed perspective view of the gage runner; and

Fig. 3 is a sectional view through a portion of a planter frame, illustrating the clamping engagement of the shank of our improved gage therewith.

Referring now to these figures, and particularly to Fig. 1, we have shown portions 10 and 11 of a planter frame, being respectively the front and rear transverse bars, to the former of which the arms 12 of the planting shoe 13 are connected. This connection, as is common, is adjustable by virtue of a series of openings 14 in the front bar 10, which permit of lateral shifting movement of the planting shoe, the arms 12 of which have connecting bolts 15 to extend through the said openings.

Our invention proposes a gage runner capable of adjustment with the adjustment of the planting shoe and without the necessity of special construction of the front frame bar 10, already weakened as far as desirable or safe by the openings 14, as well as a gage runner which may, of course, be adjusted vertically to properly perform its functions as a depth gage for the movement of the shoe 13 in the soil.

To this end we propose a gage runner including a lower flat runner plate 16 curved upwardly at its front end as at 17 and rigidly secured in its length by means of rivets and the like 18 to the flanged sides 19 of the lower straight portion 20 of its supporting shank 21. This shank is curved in an upward direction at the front end of its lower straight portion 20, to correspond to the curvature of the forward curved portion 17 of the runner plate, and is further curved in a rear direction over the forward end of the runner plate and terminates at its upper end in a straight portion disposed approximately at right angles to its lower straight portion 20 and approximately above a point mid way of the length of its lower straight portion 20.

The upper straight portion of the shank 21 has side flanges 22 provided with vertical series of apertures 23 and together forming one portion of a clamp, the other portion of which is in the form of a separate plate 24, having upper and lower openings to aline with the openings 23 of the shank-carried clamping member. Thus the two members of the clamp are adapted for the reception of clamping bolts 25, the openings thereof being so spaced that the said clamping bolts may be extended above and below the forward frame bar 10 of the planter against the front and rear surfaces, respectively, of which the clamping members 22 and 24 are positioned.

In this way it is obvious we accomplish an adjustable connection both vertically and horizontally between our improved gage runner and the frame of the machine, taking the strain thereof away from the planting shoe to which the gage runner is usually attached and without special construction of the frame bar 10, the latter of which is generally already weakened as far as desirable by virtue of its openings 14.

It is also obvious that in providing a device which accomplishes the above advantages, our invention proposes a gage runner which is simple, strong, durable, and one which is readily adjustable and generally efficient.

We claim:

1. A gage runner comprising a lower horizontally disposed gage plate having an upwardly curved forward end, a shank having a lower horizontal flat portion provided with lateral flanges to which the gage plate is secured and having an upwardly and rearwardly curved portion terminating in a vertically disposed upper end approximately above the center of its lower straight portion, the said upper end of the shank having side flanges provided with vertical series of openings and forming one member of a clamp, a plate forming the other member of the clamp and having openings arranged to aline with pairs of openings of the said flanges, and clamping bolts arranged to extend through the alined openings and spaced apart to receive the frame bar of a planter therebetween.

2. A gage runner comprising a lower substantially flat gage plate having a forward upturned end, a curved shank having a lower flat portion to which the gage plate is rigidly secured and having an upper flat end approximately at right angles to its lower flat portion, said upper end having apertured flanges together forming one member of the clamp, an apertured plate separate from the shank and forming the other member of the clamp, and clamping bolts extending through the apertures of the said plate and adjustably disposed in the apertures of the shank flanges, as and for the purpose described.

In testimony whereof we affix our signatures.

SOLVIE S. VATHING.
EDWARD O. LAUGEN.

Copies of this patent may be obtained for five cents each, by addressing the "Commissioner of Patents, Washington, D. C."